US006276053B1

(12) United States Patent
Sinnesal

(10) Patent No.: US 6,276,053 B1
(45) Date of Patent: Aug. 21, 2001

(54) DEVICE FOR FIXING AND REMOVING STUD SEATS FOR BOOTS

(76) Inventor: Daniel Sinnesal, 15, villa des Merisiers, F-91800 Boussy Saint Antoine (FR)

( * ) Notice: Subject to any disclaimer, the term of this patent is extended or adjusted under 35 U.S.C. 154(b) by 0 days.

(21) Appl. No.: 09/403,525

(22) PCT Filed: Apr. 20, 1998

(86) PCT No.: PCT/FR98/00790

§ 371 Date: Dec. 20, 1999

§ 102(e) Date: Dec. 20, 1999

(87) PCT Pub. No.: WO98/47666

PCT Pub. Date: Oct. 29, 1998

(30) Foreign Application Priority Data

Apr. 22, 1997 (FR) .................................................. 97 04967

(51) Int. Cl.[7] .................................................. B23P 19/00

(52) U.S. Cl. ................................ 29/798; 29/256; 29/270; 29/278; 81/438; 81/176.15; 81/490; 7/170

(58) Field of Search .............................. 29/798, 235, 256, 29/270, 278, 280; 81/437, 438, 490, 177.4, 46, 176.15; 7/102, 138, 165, 170

(56) References Cited

U.S. PATENT DOCUMENTS 2,448,805 * 9/1948 Ingram .............................. 81/176.15
3,140,625 * 7/1964 Pannozzo .......................... 81/176.15
5,272,943 * 12/1993 Edwards ................................ 81/461
5,865,078 * 2/1999 Langford ................................ 81/461
5,887,496 * 3/1999 Pollard et al. ......................... 81/461

FOREIGN PATENT DOCUMENTS 36 30 253 3/1988 (DE) .
1 228 258 8/1960 (FR) .
2 720 967 12/1995 (FR) .

* cited by examiner

*Primary Examiner*—S. Thomas Hughes
*Assistant Examiner*—Jermie E. Cozart
(74) *Attorney, Agent, or Firm*—Young & Thompson

(57) ABSTRACT

A device for fixing and removing stud seats for boots. The seats are designed to be fitted from above the boot sole and receive the studs screwed from underneath the sole. The device includes a first portion forming a handle having a means for fixing the seats on a first surface and a second portion forming a handle having means for removing the seats from a first surface, the first surface of the first portion capable of being fitted into a second surface of the second portion, and the first surface of the second portion capable of being fitted into a second surface of the first portion.

10 Claims, 4 Drawing Sheets

DEVICE FOR FIXING AND REMOVING STUD SEATS FOR BOOTS

BACKGROUND OF THE INVENTION

The present invention relates to the field of devices for fixing and removing seats used to fasten studs under the sole of a boot, for example a sports boot such as a football boot.

Boots may be provided with two types of seat. A first type is fixed, embedded in the material forming the sole of the boot. A second type may be removed and replaced, being fastened from the inside of the boot. It is understood that the fixing or removal of such bases from the inside of a boot, which is a location to which there is poor access, is a difficult operation. With this type of seat, the sole is pierced through its entire thickness with a number of holes corresponding to the number of studs which it is desired to fit. The operator, during manufacture of the boot or during the changing of a seat, takes a seat and arranges it, from the inside of the boot, in the hole for which it is intended. The operator then exerts a force on the seat in order to secure it to the sole, by causing spikes in the seat to penetrate the material of the sole and so that the upper face of the seat is flush with the surface of the sole so as not to make the boot uncomfortable to wear. The operator then screws in a stud from underneath the sole.

During removal of the seat, firstly the stud is unscrewed, the seat being secured in rotation with the sole by means of its spikes, and then pulls out the seat before fitting a new one.

The French patent published under no. 2 720 967 discloses a pincer with two articulated branches, one side serving as handle and the other side serving as jaws for fixing and removing the seats. The jaws are able to receive a removable pin for the removal of seats and accessories which make it possible to screw in and to unscrew the various types of studs. A pincer provided for screwing in/unscrewing two types of studs thus comprises four components in total. Moreover, during fixing or removal of seats, the boot is placed between the jaws of the pincer and the top or vamp of the boot is also gripped between the said jaws. This pincer operates satisfactorily, but it is bulky and relatively cumbersome to use and is thus not suited to being placed in a garment pocket. The pincer comprises four components in total, three of which are small, which presents a risk of loss, for example on a football pitch.

SUMMARY OF THE INVENTION

The object of the invention is to remedy the drawbacks of the aforesaid pincer and to propose a device for fixing and removing seats which is compact, lightweight and reduces the risk of components being lost.

The fixing and removal device, according to the invention, is provided for boot stud seats. The seats are intended for fitting from above a boot sole and for receiving studs screwed in from underneath the sole. The device comprises a first portion forming a handle provided with a means for fixing seats on a first face and a second portion forming a handle provided with a means for removing seats from a first face. The first face of the first portion is capable of being fitted into a second face of the second portion and the first face of the second portion is capable of being fitted into a second face of the first portion. A device which can be used for fixing and removing seats by means of two components of substantially identical dimensions, which reduces the risk of the components being lost, is thus made available.

In one embodiment of the invention, the two portions fitted into each other are the length of a user's hand. The device is easily stored in a garment pocket.

Advantageously, the fixing means comprises a planar bearing surface projecting with respect to the first face of the first portion and a threaded pin projecting with respect to the said planar bearing surface. It is thus possible to fix a seat by forcing it into the material of the sole by means of a pulling force obtained by screwing the threaded pin into the seat while bearing on the underside of the sole. This avoids the vamp being crushed.

In one embodiment of the invention, the planar bearing surface has a hexagonal shape.

In one embodiment of the invention, the removal means comprises a cylindrical bar projecting with respect to the first face of the second portion. Removal is achieved by inserting the cylindrical bar into the hole provided for the stud and by exerting a pushing force on the device.

In one embodiment of the invention, the second face of the first portion comprises a first means for screwing in/unscrewing studs and the second face of the second portion is provided with a second means for screwing in/unscrewing studs. The device is thus capable of being adapted to two different types of studs while comprising only two components.

Preferably, the first face of the first portion and the first face of the second portion are capable of being fitted together. The device thus offers no roughness.

The threaded pin of the first face of the first portion may project inside a hole provided in the bar of the first face of the second portion and the said bar is able to project into a hole provided between the threaded pin and the planar bearing surface of the first face of the first portion and the said planar bearing surface is able to project into a hollow provided around the bar, in a first face of the second portion.

In one embodiment of the invention, the second face of the first portion has a hexagonal shape provided in order to fit into a hollow of corresponding shape of the first face of the second portion. The two portions are thereby secured in terms of rotation.

The first face of the first portion can comprise a protuberance of hexagonal shape provided in order to fit into a hollow of adapted shape of the second face of the second portion. In this case also, the two portions are secured in terms of rotation.

Produced in this way, there are three fitting options for the device, the first for fixing seats, the second for removing seats and the third for the instantaneous change from one type of stud to another, there being, in all three cases, axial securing by fitting and securing in terms of rotation on account of complementarity of shapes between the two portions.

BRIEF DESCRIPTION OF THE DRAWINGS

The invention will be better understood by studying the detailed description of an embodiment which is in no way limiting and which is illustrated by the appended drawings, in which.

DETAILED DESCRIPTION OF THE PREFERRED EMBODIMENTS

Figure 1:
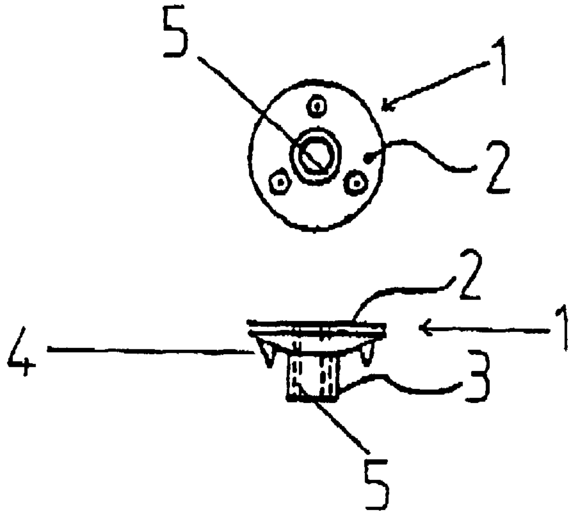
FIG. 1 diagrammatically shows a seat.

As may be seen in FIG. 1, the seat 1 comprises a planar upper face 2, a cylindrical portion 3 perpendicular to the upper face 2 and extending downwards, and a plurality of claws 4 arranged on the edge of the seat 1, around the cylindrical portion 3 and facing downwards. A hole 5 coaxial with the cylindrical portion 3 passes right through the seat 1 and is provided with a screw thread.

Figure 2:
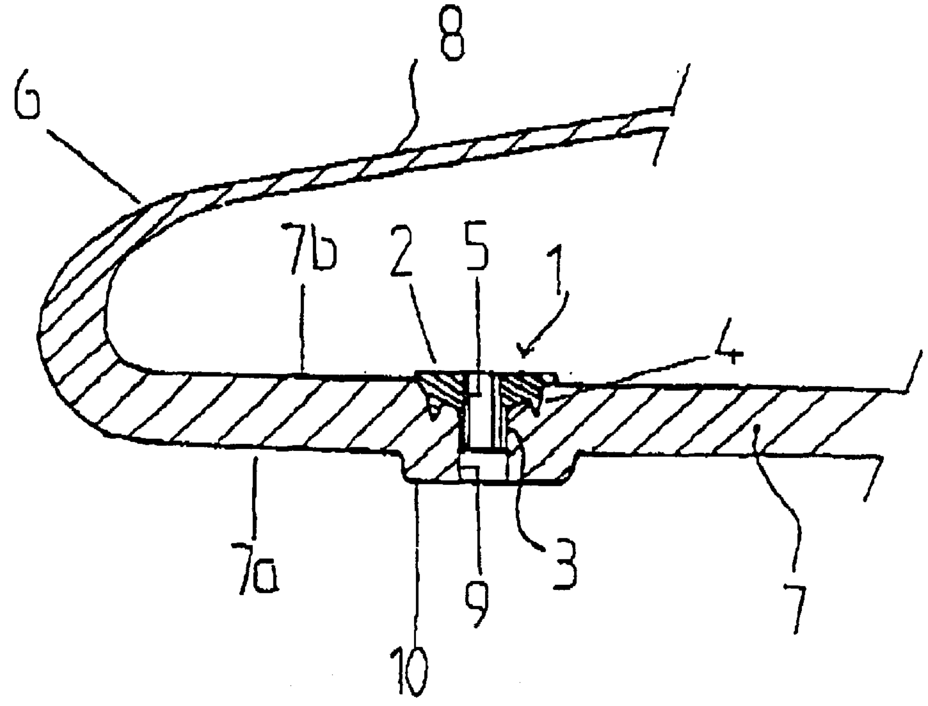
FIG. 2 is a partial view in longitudinal section of a boot equipped with a seat.

As may be seen in FIG. 2, a boot 6 comprises a sole 7 and a vamp 8. The sole 7 is provided with a plurality of through-holes 9, just one of which is shown in FIG. 2. The sole 7 comprises, on its lower surface 7*a*, a circular reception surface 10 arranged around the hole 9. The sole 7 comprises, on its upper surface 7*b*, a seat 1, the cylindrical portion 3 of which is arranged in the hole 9 and the claws 4 of which project into the generally synthetic material forming the sole 7.

When a seat 1 is fitted, an attempt is made to cause it to penetrate the material of the sole 7 so that the upper face 2 of the seat 1 projects very slightly or is even flush with the upper surface 7*b* of the sole 7. A stud, which is not shown, provided with a threaded pin adapted to the screw thread of the hole 5 of the seat 1 and coming into contact with the reception surface 10 of the sole 7 is then screwed in.

Figure 3:
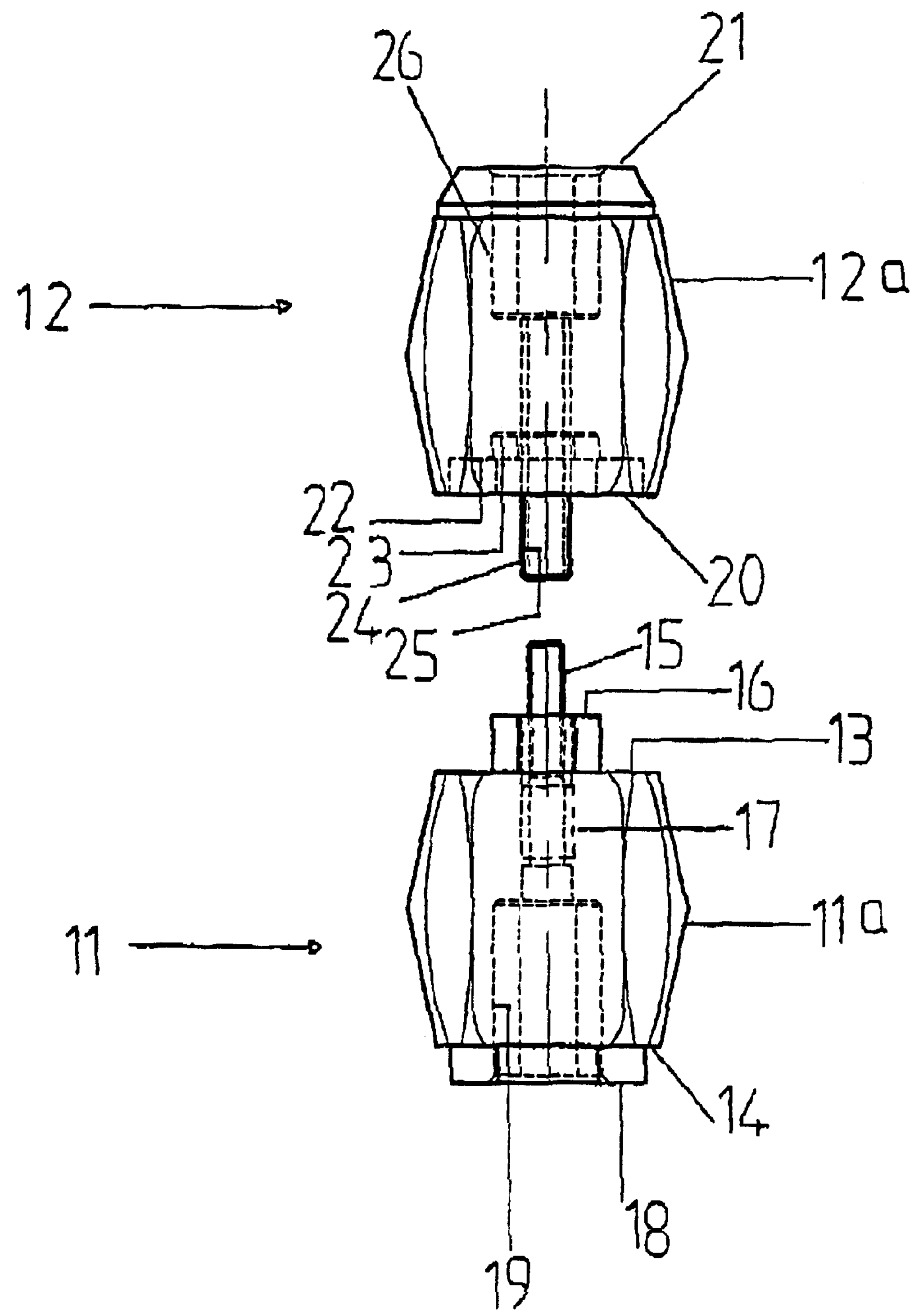
FIG. 3 is a side view in elevation of the device according to the invention in a fitting mode.
Figure 4:
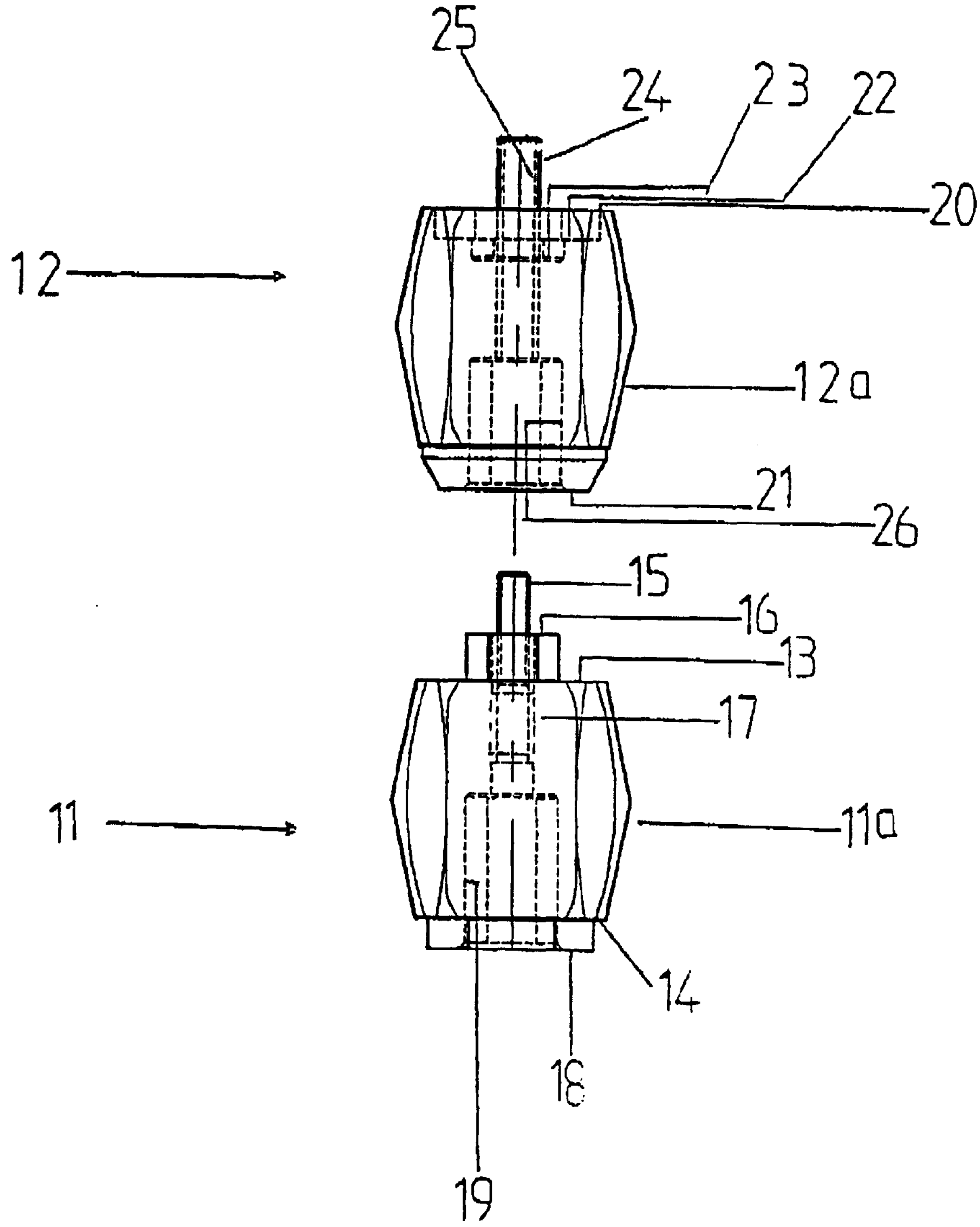
FIG. 4 is a view similar to FIG. 3, showing the device in another fitting mode.
Figure 5:
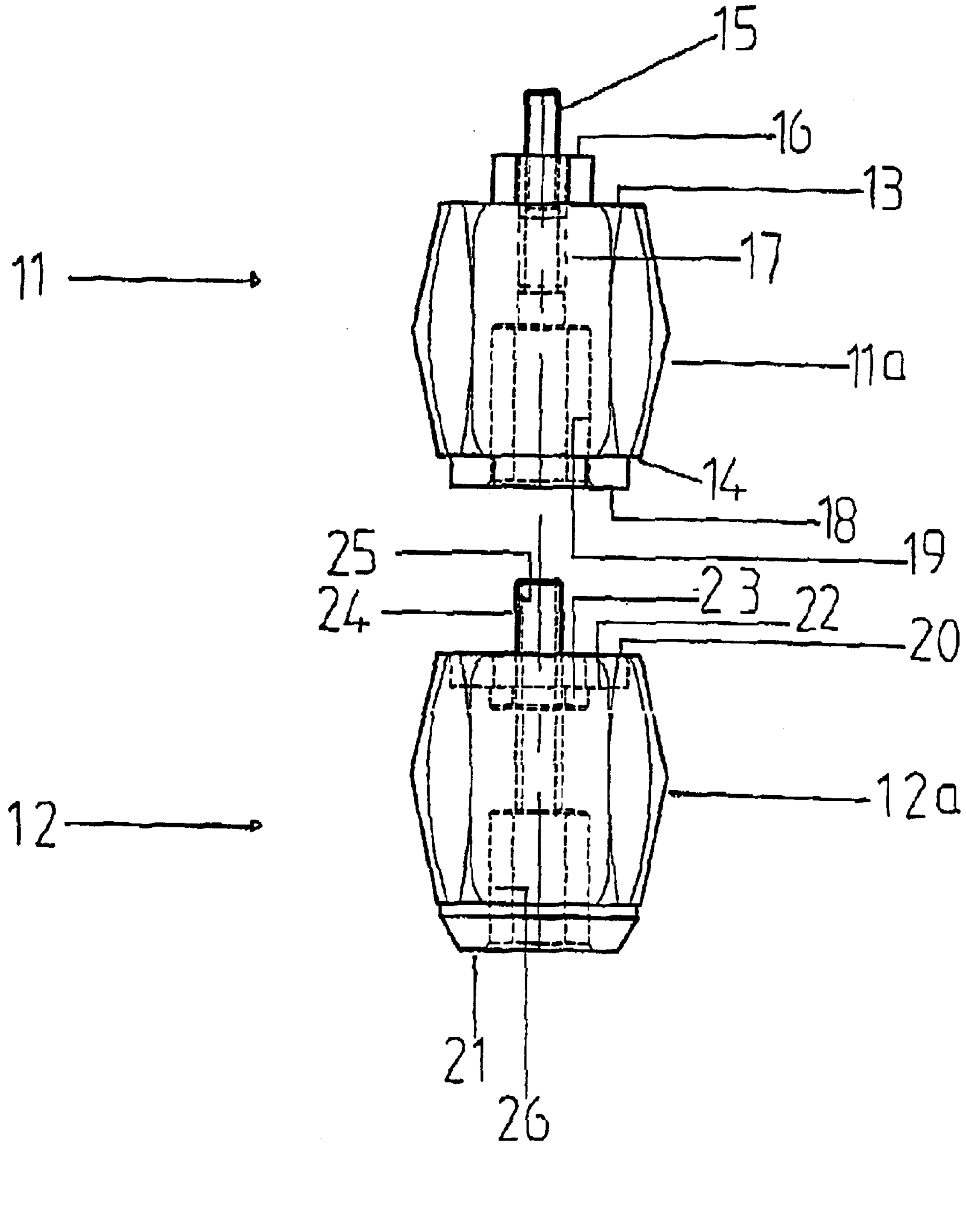
FIG. 5 is a view similar to FIG. 3, in another fitting mode.

As may be seen in FIGS. 3 to 5, the device for fixing and removing seats comprises a first portion 11 and a second portion 12. The first portion 11 comprises a first face 13 and, opposite, a second face 14. The first face 13 comprises a threaded pin 15 projecting outwards and having a diameter which is adapted to interact with the screw thread of the hole 5 of the seat 1. The threaded pin 15 has a length which is suitable for being screwed into the seat 1, over a sufficient length even before the seat 1 has been forced into the material of the sole 7. The first face 13 of the first portion 11 also comprises a planar bearing surface 16, provided around the threaded pin 15, of hexagonal shape and slightly projecting with respect to the first face 13 proper, for example projecting by 7 mm, while the threaded pin 15 projects by 11 mm with respect to the bearing surface 16. Radially, between the threaded pin 15 and the bearing surface 16 there is a circular hole 17 extending towards the inside of the first portion 11 over a certain length, for example of the order of 12 mm. Each side of the bearing surface 16 has a length equal to 7 mm.

The second face 14 of the first portion 11 comprises a hexagonal projection 18 of short length, for example 3 mm, and with sides of the order of 13 mm long. In the center of this projection 18 there is a hollow 19. On the edges of the hollow 19 flush with the projection 18 there is an annular metallic insert, not shown, comprising three radial spikes facing inwards and having a shape adapted to a given type of stud. It is thus possible to engage with a stud in order to screw it in or to unscrew it.

The second portion 12 comprises a first face 20 and a second face 21 at the opposite end to the first one. The first face 20 comprises a first hexagonal hollow 22 with dimensions adapted to the projection 18 of the second face 14 of the first portion 11, a second hollow 23 coaxial with the first hollow 22 and having dimensions adapted to the bearing surface 16 of the first face 13 of the first portion 11, and a hollow cylindrical bar 24 coaxial with the hollows 22 and 23 and projecting with respect to the first face 20, for example by approximately 12 mm. The hole 25 of the cylindrical bar 24 passes right along the entire length of the latter and emerges on the second face 21 of the second portion 12. The hole 25 is smooth and has a diameter adapted in order to receive the threaded pin 15 of the first face 13 of the first portion 11.

The second face 21 of the second portion 12 comprises a hexagonal hollow 26 coaxial with the hole 25 of the cylindrical bar 24 and in communication with the said hole 25. The hollow 26 is of a size which is adapted in order to interact with the protuberance formed by the bearing surface 16 of the first face 13 of the first portion 11 and with a given type of stud, for screwing it in and unscrewing it.

The first portion 11 and the second portion 12 are produced from synthetic material, with the exception of the threaded pin 15, the cylindrical bar 24 and the metallic insert. The side walls 11*a* and 12*a* of the first and second portions 11 and 12 are provided with reliefs intended to promote gripping and the transmission of torque between a user's hand and the device.

FIG. 3 shows more particularly that the first face 13 of the first portion 11 and the first face 20 of the second portion 12 are able to fit together. The threaded pin 15 then projects into the hole 25. The cylindrical bar 24 projects into the hollow 17. The protuberance formed by the bearing surface 16 projects into the hexagonal hollow 23. The device thus fitted is very compact and has no roughness. Each end of the device carries a means for screwing in/unscrewing studs, which makes it possible to change instantaneously from one type of stud to another. The transmission of torque between the two portions 11 and 12 of the device is achieved by the interaction of the protuberance formed by the bearing surface 16 and the hexagonal hollow 23.

In FIG. 4, the first face 13 of the first portion 11 fits into the second face 21 of the second portion 12. The threaded pin 15 and the bearing surface 16 then project into the hexagonal hole 26. Torque is transmitted by means of the interaction of the protuberance formed by the bearing surface 16 with the hexagonal hollow 26. The device is thus in the position for removing seats, while being able to screw in/unscrew one type of stud.

In FIG. 5, the first face 20 of the second portion 12 and the second face 14 of the first portion 11 are ready to be fitted together. The cylindrical bar 24 projects into the hexagonal hollow 19 and the hexagonal projection 18 is accommodated in the hexagonal hollow 22 of corresponding size, which makes it possible to transmit torque. The device is thus in the position for fixing seats, while being able to screw in/unscrew one type of stud.

The change from one configuration of the device to another is achieved by separating the two parts 11 and 12 and fitting them back together and is therefore extremely quick and easy.

By virtue of the invention, a device for fixing and removing seats is made available which is compact, economical and the synthetic material of which may be dyed in the mass in a bright color, which avoids the loss of one of the portions.

What is claimed is:

1. A device for fixing and removing stud seats for boots, said seats being fit from above a boot sole and receiving studs screwed in from underneath said sole, comprising:

a first handle portion having a first fixing face and a second fixing face, said first fixing face having a fixing means for fixing said seats; and a second handle portion having a first removing face and a second removing face, said first removing face having removal means for removing said seats, wherein said first fixing face matingly engages said second removing face and said first removing face matingly engages said second fixing face.

2. The device according to claim 1, wherein said first and said second portions engaged with each other are a length of a user's hand.

3. The device according to claim 2, wherein said fixing means comprises:

a planar bearing surface projecting with respect to said first fixing face, and a threaded pin projecting with respect to said planar bearing surface.

4. The device according to claim 3, wherein said planar bearing surface has a hexagonal shape.

5. The device according to claim 2, wherein said first removing face comprising a bar having a hole and a hollow surrounding said bar, said threaded pin projecting inside said hole, said bar projecting into an aperture between said threaded pin and said planar bearing surface, said first fixing face and said planar bearing surface projecting into said hollow.

6. The device according to claim 1, wherein said removal means comprises a cylindrical bar projecting with respect to said first removing face.

7. The device according to claim 1, wherein said second fixing face comprises a first means for screwing in/unscrewing studs and said second removing face comprises a second means for screwing in/unscrewing studs.

8. The device according to claim 1, wherein said first fixing face and said first removing face matingly engage.

9. The device according to claim 1, wherein said second fixing face has a hexagonal protuberance for fitting into a hollow of a corresponding shape of said first removing face.

10. The device according to claim 1, wherein said first fixing face has a hexagonal protuberance for fitting into a hollow of a corresponding shape of said second removing face.

* * * * *